Figure 1:
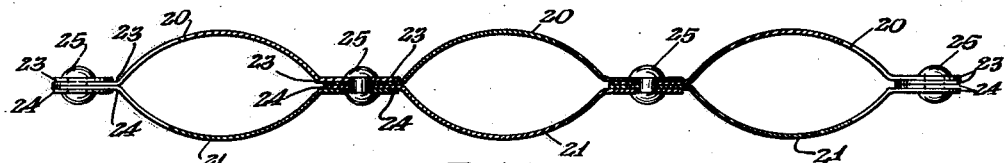

March 24, 1942. C. H. KÖHN 2,277,593
RESILIENT CHAIN, SUCH AS PULL CHAINS
Filed July 3, 1940 2 Sheets-Sheet 1

INVENTOR.
Claus H. Köhn
BY
ATTORNEY.

March 24, 1942. C. H. KÖHN 2,277,593
RESILIENT CHAIN, SUCH AS PULL CHAINS
Filed July 3, 1940  2 Sheets-Sheet 2

INVENTOR.
Claus H. Köhn
BY J. O. Ollier
ATTORNEY.

Patented Mar. 24, 1942

2,277,593

UNITED STATES PATENT OFFICE 2,277,593

RESILIENT CHAIN, SUCH AS PULL CHAIN

Claus H. Köhn, Rapperswil, Switzerland, assignor to Fritz Mommendey & Sohn, Rapperswil, Switzerland Application July 3, 1940, Serial No. 343,713
In Switzerland March 24, 1939

3 Claims. (Cl. 59—79)

This invention relates to chains for all purposes where some resilience in the transmission of power by the chain is desired. In particular, the invention is concerned with chains used as traces, or parts thereof, on harnesses for horses and other draught animals, or as tug chains for towing cars and other vehicles, implements and vessels where resilient transmission of power, particularly when starting off is desired.

Heretofore, means for resiliently transmitting power consisted of strong and tightly coiled springs interposed between straps, traces, ropes, etc. and the objects to be pulled. Thus, in traces connected with harnesses for horses and other draught animals, strong coil springs were used covered with fabric or leather in order to prevent injury to the animals. Such springy devices were relatively heavy and clumsy. Whenever the traces were entirely replaced by chains, attempts were also made to render them somewhat resilient by arranging the links of the chains slightly movable relative to each other and interposing coil springs between them. It is evident that structures of this type are complicated and include a great number of parts which render the manufacture and assembly difficult and expensive in addition to the fact that such structures are heavy.

At any rate, power transmitting elements obtained in this way are complicated structures, heavy, voluminous, relatively high priced, and comprise many elements, each capable to be destroyed or broken individually, liable to cause difficulties while being used. They are also subjected to considerable wear during use.

It is therefore an object of the invention to provide chains resilient in themselves which are relatively light in weight, simple to manufacture and easily assembled.

It is another object of the invention to provide chains which are resilient in themselves to a certain limit and degree so as to resiliently transmit power when the latter is applied, but continue transmission in a more or less rigid way.

It is another object of the invention to construct chains of some inherent resilience of identical elements preferably of sheet metal.

It is still another object of the invention to construct chains of some inherent resilience of elements differing in size so as to permit their being folded in order to require as little space as possible.

It is further an object of the invention to construct chains of some inherent resilience of groups of elements of substantially the same shape and size which permit folding or bending of the chain, particularly to occupy the smallest possible space when not in use.

It is still a further object of the invention to construct chains of some inherent resilience of elements of same or different size inter se, which when assembled can easily move, particularly turn relative to each other.

Figure 2:
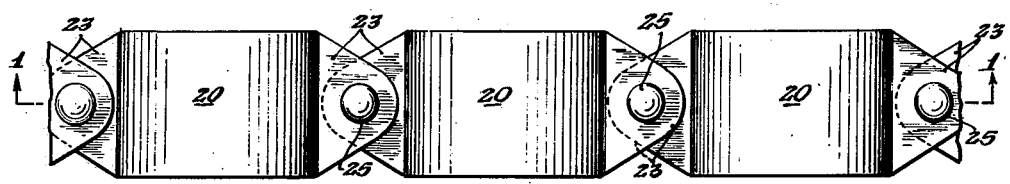
Figure 3:
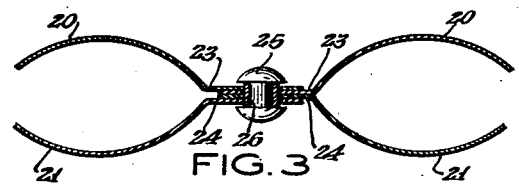
Figure 4:
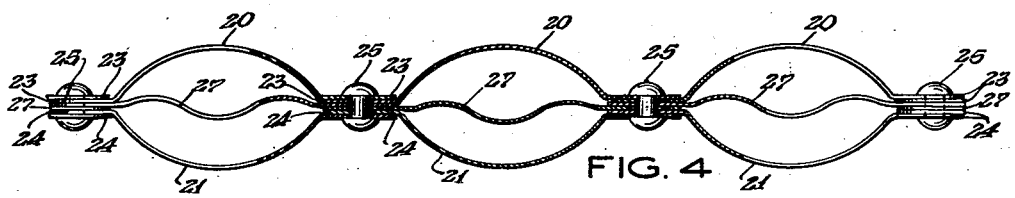
Figure 5:
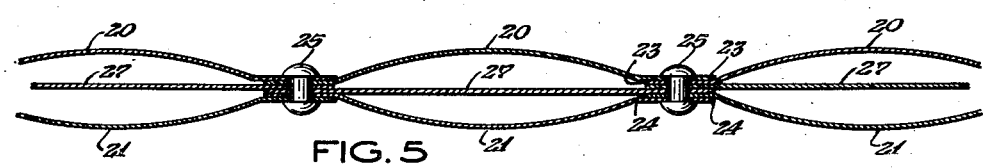
Figure 6:
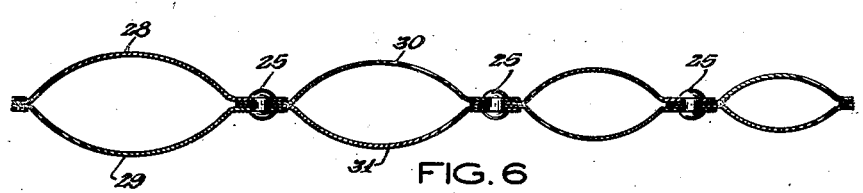
Figure 7:
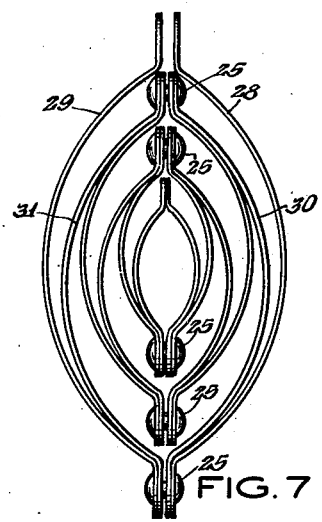
Figure 8:
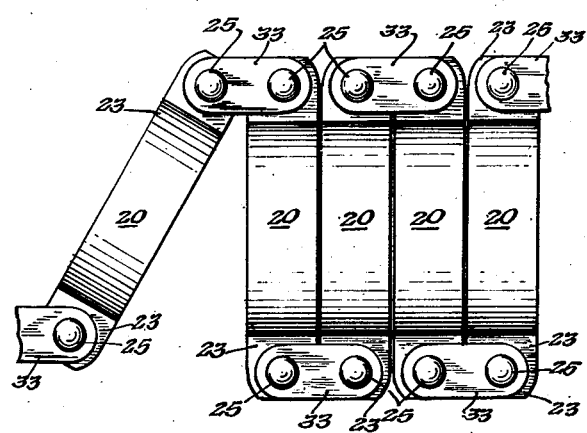
Figure 9:
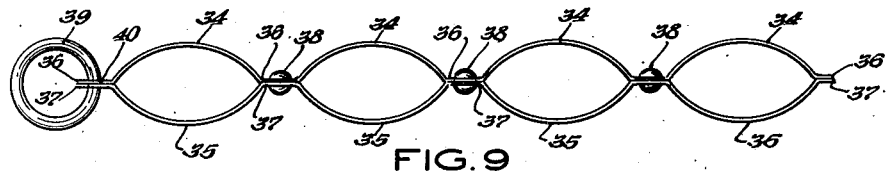
Figure 10:
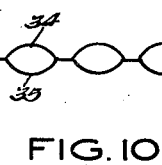
Figure 11:
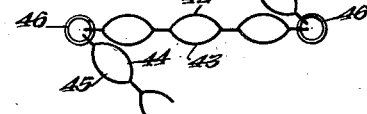
Figure 12:
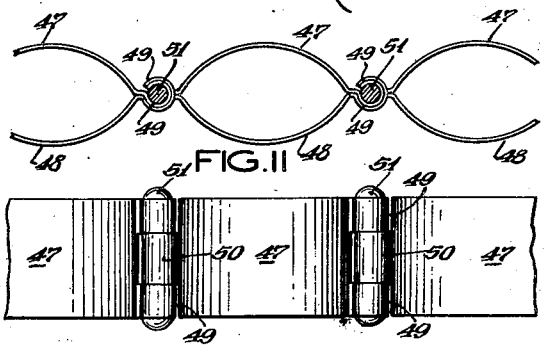
Figure 13:
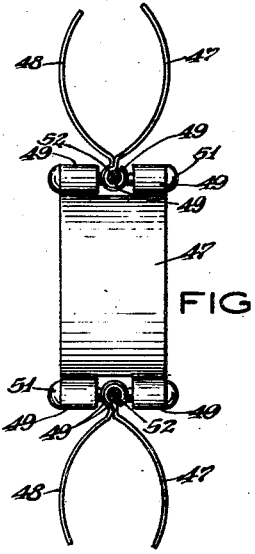

These and other objects of the invention will be more clearly understood as the specification proceeds with reference to the drawings in which Fig. 1 shows a cross section through a chain according to the invention along line II—II in Fig. 2, Fig. 2 a top view of a chain according to Fig. 1, Fig. 3 in cross section a modification of the connection between the links of a chain shown in Fig. 1, Figs. 4 and 5 a cross section through another embodiment of the invention with resilient links and means to limit their resilience unloaded and under load, respectively, Fig. 6 in cross section a modification of the invention applying different sizes of links, Fig. 7 in side elevation a chain according to Fig. 6 folded, Fig. 8 in top view another embodiment of the invention in folded state, Figs. 9 and 10 in side elevation and diagrammatically, respectively, a further modification of the invention, Fig. 11 in side elevation and Fig. 12 in top view a chain the links of which are turnably connected, and Fig. 13 a top view of a chain in which links are connected by means of universal joints.

Referring to Figs. 1 and 2 the resilient chain is composed of a number of links, each of which consists of a pair of curved elements 20, 21 extending to opposite sides, which are e. g. cut, punched or the like from elastic sheet metal, preferably strips of steel. Each element comprises flat extensions 23, 24 on both ends provided with holes. The individual elements with extensions or flaps 23, 24 and holes therein may be cut or punched first from flat strips and then bent, preferably in the heat and thereafter quenched and annealed. However, also a continuous strip of sheet metal without end may first be shaped or corrugated in the heat by rolling between suitably profiled rolls and thereafter cut or punched into pieces corresponding to elements 20, 21; quenching and annealing may be done either before or after shaping and cutting or punching of the individual elements.

It should be understood, however, that any other suitable way of manufacturing the elastic or springy elements 20, 21 with extensions 23, 24 may be applied. In particular, they may be manufactured individually.

The individual elements are then assembled in the way to be derived from Figs. 1 and 2; the flat ends 23, 24 on the left side of a pair of elements 20, 21 are brought into contact with each other, and the flat ends 23, 24 at the right side of another pair of elements 20, 21 are positioned above and below them, respectively. Thereafter a bolt 25 is passed through the aligned holes of the thus assembled four extensions 23, 23, 24, 24, connecting them in a rigid or rotatable way. In this exemplification of the invention rivets 25 are used and it depends upon the way in which the rivet heads are pressed upon the extensions whether the latter can rotate relative to each other or are rigidly held together. Instead of rivets, screws or other suitable means may be used for the same purpose.

In this way a chain is obtained the links of which consist of two resilient springy elements of sheet metal, preferably steel, curved outwardly in opposite directions. Upon application of power to one end and a load to the other end of the chain the springy elements first flatten to some degree and thereby gradually increase the amount of power transmitted through them to the load. As soon as an equilibrium is obtained, the full power is transmitted continuously. Any fluctuations in the load, due to variations in the resistance to its movement are buffered to some degree by the resilience or elasticity of the chain. In a similar way, shocks due to sudden changes in the pulling power are also absorbed.

In order to facilitate turning of the resilient links of the chain relative to each other, and to prevent wear between the extensions or flaps 23, 24, and bolt 25, sleeves 26 of suitable material, such as self-lubricating material comprising a metal base and graphite incorporated therein, may be arranged between bolt 25 and the holes in flaps 23, 24 as shown in Fig. 3.

In some cases the elastic links if stretched or flattened to a certain extent, are liable to break or soon to lose their initial elasticity; in order to prevent extreme and undesired stretching or flattening of the elements forming the links, an arrangement according to Figs. 4 and 5 may be used. According to this embodiment of the invention somewhat corrugated strips 27 of sheet metal are arranged between adjacent ends of the links. Individual strips may be used each provided with holes near their ends and passed by the same bolts 25 which connect flaps 23, 24. The ends of strips 27 are preferably interleaved with different pairs of flaps joined by bolts 25, as can be seen in Fig. 4.

It is however equally within the scope of the invention to provide a single strip 27 which passes through two or more adjacent links, or from one end of the chain to the other and is provided with distant holes each passed by a bolt 25. In this instance the strip is arranged preferably symmetrically between opposite pairs of flaps 23, 24 and bolts 25 are passed through aligned holes of the flaps and strip 27.

The corrugations in strip 27 are such that the latter are shaped as shown in Fig. 4 when no power is transmitted through the chain and consequently the elements 20, 21 are fully bent outwardly. When power is applied to the chain, first the elements 20, 21 are gradually flattened and transmit a gradually increasing pull on the load; if the elastic forces thus produced in the flattening elements do not suffice to move the load, eventually strip 27 straightens out, takes over the transmission of power and pulls the load. Fig. 5 shows the elements of the chain in this latter position. Thereby the elastic elements 20, 21 forming the links according to the invention are shunted by the strip 27 and thereby protected against overloading, breaking or other damage. When the power transmitted is reduced, the elastic elements 20, 21 again take over the transmission of the pull and return more or less to their initial position, and entirely so as soon as the power transmitted ceases altogether. Then also the stretched and thereby straightened out strips 27, Fig. 5, return into their initial slightly curved position according to Fig. 4, due to their elasticity.

Instead of using elements 20, 21 of substantially equal shape and size, as is the case in the exemplifications of the invention illustrated above, the elements of which adjacent links are composed may be different as shown in Fig. 6. There the adjacent links are made of pairs of elastic elements of sheet metal, preferably steel, bent outwardly in opposite directions, gradually decreasing as to size, e. g. in one direction. For instance elements 28, 29 forming one link are the largest, elements 30, 31 forming the next link are somewhat smaller, and so on. Again the elements are connected with each other by means of bolts 25.

By this arrangement of links of different size various advantages are obtained. It is obvious that links comprised of larger and more outwardly bent elements are flattened out or straightened easier by the power applied thereto than smaller elements, provided the cross sections and material of all elements are the same, and thus the rate of gradual transmission of power when starting to pull is improved. Furthermore, it is possible to fold such a chain in the way shown in Fig. 7, where links of smaller size enter the inner space of links of larger size and the space occupied by the folded chain is reduced to a minimum.

It will be appreciated by anyone skilled in the art that the same effect of more gradually increasing the transmission of power or pull through the chain can be obtained by composing the chain of links of equal shape and size but using material of different elasticity or resistance against stretching or flattening for the different links so that when a pull is first applied, links of lowest resistance are flattened, and thereafter gradually or stepwise the links of greater resistance.

It is also evident to anyone skilled in the art that instead of using material of different resistance against flattening, the same material may be used for the elements of all links, but that either their width is increased from one link to the other if their thickness is the same, or the thickness is increased if the width of all elements is the same, or both the width and thickness of the elements of different links may vary so that a chain can be obtained in which any desired rule of gradually or stepwise increasing or decreasing the transmission of power or pull can be achieved.

It is obvious that in an arrangement according to Fig. 6 strips 27 limiting the stretching of the individual links cannot be used if the chain should be foldable also.

If it is desired to apply strips 27 in a foldable chain, the feature according to Fig. 8 may be used. Therein pairs of adjacent links are connected by the intermediary of additional links 33, and the bolts 25 serve to connect each end of every link with the intermediary link 33. The latter consists preferably of cut or punched flat pieces of sheet metal, one applied above and the other below the interleaved flat portions 23 (24) of the elements of each resilient link. The length of the intermediary 33 is preferably such that in folded state of the chain, Fig. 8, adjacent links 20 just contact each other and the folded chain occupies the smallest possible space.

Chains which can be thus folded in a way requiring little room are of advantage for automobiles and other carriages because they can be stowed away easily.

In the modification of the invention according to Fig. 9 two corrugated strips 34, 35 of sheet metal are connected with each other in such a way that the curved portions of each strip extend outwardly in opposite direction while the flattened valleys 36, 37 of the strips contact each other and are connected by means of bolts 38, or screws or the like. It will be appreciated that such a resilient element can not be bent in a direction vertical to the plane of the drawing, but that it otherwise offers many advantages. At the ends of such a resilient element connecting rings 39 or the like can be provided, passed through holes 40 in the flattened end portions 36, 37 of the strips. In order to reduce the length of the chain when stowed away, short lengths of the resilient elements 34, 35; 40, 41; 42, 43; 44, 45, etc., Fig. 10, in desired number are connected with each other by means of rings 46. Any number of individual corrugations can be arranged between two rings 46 and thereby the length of the chain in folded state be determined. It is also obvious that in such a way chains of desired total length can be composed of any number of individual resilient elements 34, 35; 40, 41, etc. by connecting them by rings 46 which with some clearance pass through holes in the flat end portions of those elements.

While Fig. 9 shows a resilient chain according to the invention which cannot be bent vertically to the plane of the drawing, and while Figs. 1 to 8 show features of the invention according to which the chain can be bent in this way, it may sometimes be desirable to easily bend a chain parallel to the plane of the drawing. To this end a feature of the invention as shown in Figs. 11 and 12 may be used. There a link is composed of two curved elements 47, 48, each provided on one end with two spaced tongues 49, and on the other end with a single tongue 50 fitting between tongues 49, 49 of an adjacent link. The tongues 50 of elements 47, 48 are bent over each other and bolt 51. The tongues 49 of elements 47, 48 are also bent over each other and bolt 51 but with slight clearance so that bolt 51 is rigidly held by tongues 50, and tongues 49 can revolve around the bolt. Any other arrangement to the same effect may be used, and it is evident that thereby a resilient chain is obtained which can be bent in a plane parallel to that of the drawing. The links may consist of elements of same size and shape, or different size and shape in order to stagger the rate of transmission of power or pull through the chain as explained above.

If it is desired to bend the chain both in a plane parallel and vertical to the plane of the drawing, the feature of the invention according to Fig. 13 can be used. According to this feature a link consists of two elastic elements 47, 48 bent outwardly in opposite direction and each element is provided on both ends with spaced tongues 49. Tongues 49 on both ends of one element are bent around a bolt 51 each in the way explained with reference to Figs. 11 and 12. Bolt 51 is combined with another bolt 52 forming a cross, and around bolt 52 the tongues 49 of an adjacent pair of elements 47, 48 are bent. Thus a universal joint between adjacent links is accomplished rendering adjacent links of the chain turnable or bendable relative to each other in any direction desired.

It should be understood that connections as shown in Figs. 11, 12 or 13 between adjacent links may also be used in the arrangement according to Fig. 10 to connect pieces 34, 35 and 40, 41, etc., with each other.

It is also evident that strips 27 limiting the stretching of the chain may be applied in each of the features according to Figs. 9 through 13.

From the above it will be appreciated that a resilient pull chain is suggested by the invention which is easily manufactured and assembled and also inexpensive. It is also relatively light in weight.

If the chain is used instead of or as a part of a trace it can be covered with leather or fabric in order to prevent injuries to the animal by the edges of the relatively thin steel bands. The cover should be movable relative to the chain so as to prevent interference with variations in length of the latter. If desired, the cover may be stretchable to a length equalling the desired greatest length of the resilient chain when stretched by the pull on it, so that the cover would in effect replace strips 27; this presupposes of course that the cover can be made strong enough for this effect. In general, the invention prefers the arrangement of stretch limiting sheet metal strips 27.

It is also evident that a chain according to the invention is of greater strength and durability and of lower weight than ordinary chains composed of forged links. Rolled sheet metal of desired composition, such as spring metal, may be used which exceeds ordinary forged material as to strength and other properties without increasing the cost of manufacture and assembly.

It should be understood that the invention is not limited to the above exemplifications but to be derived in its broadest aspect from the appended claims.

What I claim is:

1. A resilient chain, particularly pull chain, comprising links resilient in themselves and substantially composed of at least two resilient sheet metal elements, said elements composed of a curved middle portion and flat end portions provided with holes, said curved portions in a link extending outwardly to opposite sides, and additional resilient sheet metal elements provided with distant holes and a maximum distance between the latter considerably shorter than the maximum distance between the holes in said former sheet metal elements when they are stretched, said additional elements arranged between said former elements, the ends of said former and additional elements being interleaved so that their holes are in alignment, and connecting elements passed through said aligned holes.

2. A resilient chain, particularly pull chain, comprising links resilient in themselves and substantially composed of at least two resilient sheet metal elements, said elements composed of a curved middle portion and flat end portions provided with holes, said curved portions in a link extending outwardly to opposite sides, and additional resilient corrugated sheet metal elements provided with distant holes and a maximum distance between the latter considerably shorter than the maximum distance between the holes in said former sheet metal elements when they are stretched, said additional elements arranged between said former elements, the ends of said former and additional elements being interleaved so that their holes are in alignment, and connecting elements passed through said aligned holes.

3. A resilient chain comprising a link resilient in itself, said link comprising two resilient, curved sheet metal elements, said curved portions extending outwardly to opposite sides, and additional resilient corrugated sheet metal elements provided with distant end portions coinciding with the end portions of said curved elements, and means connecting all said end portions at one end of said link together and to the next link in the chain.

CLAUS H. KÖHN.